March 17, 1953 C. A. TEA 2,631,694
SHOCK ABSORBER
Filed Nov. 3, 1950
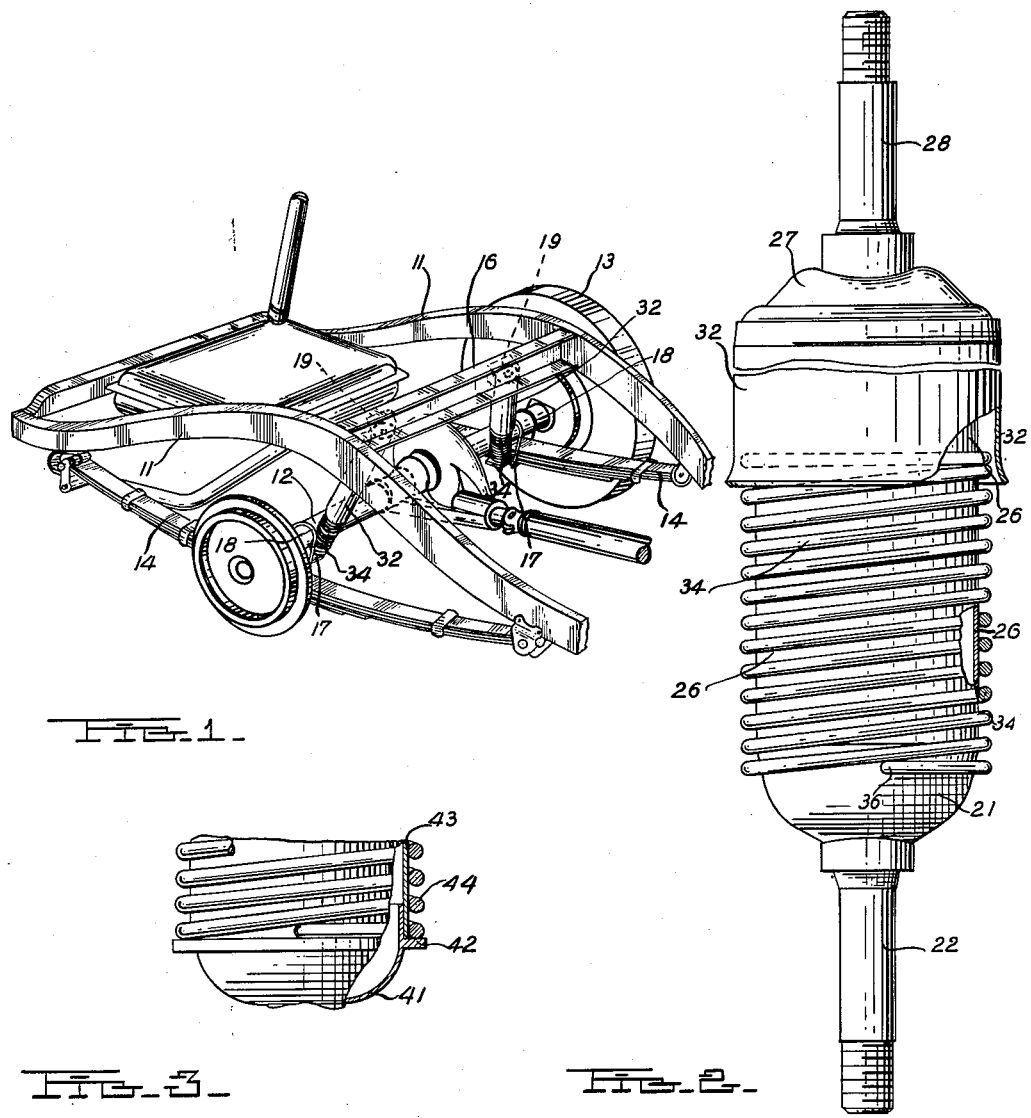
CLARK A. TEA
INVENTOR.
BY E. C. McRae
J. R. Faulkner
J. H. Oster
ATTORNEYS Patented Mar. 17, 1953

2,631,694

UNITED STATES PATENT OFFICE 2,631,694

SHOCK ABSORBER

Clark A. Tea, Detroit, Mich., assignor to Ford Motor Company, Dearborn, Mich., a corporation of Delaware Application November 3, 1950, Serial No. 193,815

1 Claim. (Cl. 188—88)

This invention relates to shock absorbers for motor vehicles.

Direct acting tubular shock absorbers currently being used on motor vehicles are enclosed in thin-walled tubular casings welded at their opposite ends to end caps. The cylinder of the shock absorber is concentrically located within this casing, and the space between the casing and the cylinder forms a fluid reservoir. For economy of manufacture the tubular casing is formed of relatively thin gauge steel and is consequently subject to injury from exterior sources. A tubular dust shield surrounds the upper portion of the casing but the lower portion is exposed. While the shock absorbers for the front wheels are usually adequately protected by the coil springs or other elements of the front wheel suspension from injury due to gravel and stones thrown up by the wheels, the rear wheels are not so protected and quite frequently damaged particularly when the vehicle is operated frequently over unpaved roads. It has been found necessary in many instances to weld a semi-circular plate to the lower portion of the casing of rear shock absorbers. This necessarily adds materially to the cost of the unit. Furthermore, with shock absorbers of the type having threaded studs extending from opposite ends and mounted to sprung and unsprung portions of the vehicle respectively by means of rubber grommets, the shock absorbers sometimes turn during use, and it is therefore necessary to provide sheet metal guards on both sides of the casing to provide adequate protection. Unless properly protected, the thin-walled tubular casings of rear shock absorbers are worn thin when used for a continued period over unpaved roads, and may eventually become dented and cracked, causing leaks.

It is therefore an object of the present invention to adequately protect the exposed thin-walled casings of tubular shock absorbers against injury from external sources and to accomplish this result without materially increasing their cost. This end is achieved in the present invention by providing a coil spring of mild steel having a free diameter somewhat less than the external diameter of the shock absorber casing and then assembling the spring over the casing. The spring is suitably secured to the casing either by welding one or both ends thereof to the casing, by providing a flange on the lower cap to retain the spring in place, or by other suitable means. The adjacent convolutions of the spring are arranged close enough together so that the spring provides adequate protection against flying stones and gravel and prevents the latter from impinging upon the surface of the casing. Inasmuch as the spring tightly embraces the casing, objectional squeaks are eliminated. Since the spring can be formed of mild steel and need not be constructed of expensive spring steel, it is relatively inexpensive and is likewise economical to assemble to the shock absorber. It has been found that its cost is considerably less than the cost of welding separate sheet metal shields to the casing or of manufacturing the casing of sufficiently heavy gauge steel to resist damage. Furthermore the spring affords complete protection around the entire circumference of the casing.

Other objects and advantages of this invention will be made more apparent as this description proceeds, particularly when considered in connection with the accompanied drawings, wherein:

Figure 1 is a perspective view of the rear portion of a motor vehicle chassis having shock absorbers incorporating the present invention.

Figure 2 is an enlarged elevational view of one of the shock absorbers shown in Figure 1, with portions thereof broken away and in section.

Figure 3 is a fragmentary elevational view, partly in section, of a modification.

Referring now to the drawings, Figure 1 shows a portion of a conventional passenger car chassis having a frame 11, rear axle 12, road wheels 13, and leaf springs 14. The frame 11 is provided with a cross member 16 located just forwardly of the rear axle 12. The leaf springs 14 are conventionally attached to the rear axle 12 by means of spring plates 17 positioned beneath the central portions of the springs and clamped to the rear axle by means of U-shaped clips 18.

A pair of direct acting tubular shock absorbers are provided, each having its upper end connected to a bracket 19 on the frame cross member 16 and its lower end connected to an extending portion of the spring plate 17.

These shock absorbers are of conventional construction and accordingly are not shown in detail. Each has a lower end cap 21 to which is welded a stud 22. The stud 22 extends through the spring plate 17 and is assembled thereto by means of a pair of rubber grommets and a nut (not shown). A thin-walled steel tube or casing 26 is seam welded at its lower end to the lower end cap 21 and forms a fluid reservoir. An upper end cap 27 is similarly welded to a stud 28 which is assembled to the bracket 19 on the frame cross member 16 by means of a pair of rubber grommets and a nut. A dust shield 32 is seam welded to the upper cap 27 and encircles the upper portion of the casing 26.

The shock absorber thus far described is conventional in construction and it will be noted that the lower portion of the tubular casing 26 is located in an exposed position relatively near the surface of the road over which the vehicle is traveling and is consequently subjected to continual bombardment by stone and gravel particles thrown up by the road wheels when the vehicle is traveling over unpaved roads. This casing is formed of relatively thin-walled steel tubing and would be subject to wear and eventual failure if unprotected. While the tubing could be made of heavier guage steel, it would have to be considerably heavier to insure against failure from this cause, and would add considerably to the cost of the shock absorber due to the added expense of fabrication and assembly as well as the added material. The necessary protection for the thin-walled casing 26 is provided by the present invention, however, in a relatively simple and inexpensive manner. Reference character 34 indicates a coil spring formed of mild steel wire. The spring at its lower end overlaps the seam weld between the lower end cap 21 and the tubular casing 26, and in the embodiment shown in the drawing, continues upwardly along the casing with its upper end slightly overlapped by the dust shield 32 in the normal relative position between the casing and dust shield. In some installations it may be necessary to cover only a portion of the exposed part of the casing 26 with the spring, since it has been found that the lower part of the casing, being nearest the road, is most subjected to damage.

The coil spring 34 has a free diameter slightly less than the diameter of the casing 26 so that when assembled thereon it snugly embraces the casing and is virtually rattle proof. The adjacent convolutions of the spring are spaced slightly from each other but are close enough to prevent stones or gravel of any material size from reaching the surface of the casing. As a result, the spring absorbs the impact of the flying particles and adequately protects the casing. It is possible for a shock absorber of the type shown to rotate somewhat during use, so that various sides of the shock absorber casing may be exposed to the particles thrown up from the road wheels, but since the spring 34 completely encircles the casing it will be seen that full protection is provided regardless of this rotation. It has been found that forming the spring 34 of .09 diameter wire with .09 spacing between convolutions provides a satisfactory unit.

Although the spring 34 snugly embraces the casing 26, it is advisable to provide other means for positively insuring against axial displacement of the spring along the casing. In the form shown in Figure 2, the lower end 36 of the spring is arc welded to the lower end cap 21. It is also possible to spotweld this end of the spring to the cap or to the casing, and if desired the upper end of the spring can also be welded to the casing.

In the modification shown in Figure 3, the lower end cap 41 is formed with an integral annular shoulder 42 forming not only a stop for the lower end of the casing 43 but also a stop for the protecting coil spring 44. The casing 43 is seam welded to the end cap 41 and the spring is assembled thereto by either slipping it over the shoulder 42 or assembling it from the opposite end of the casing. In either event, the shoulder 42 prevents downward displacement of the spring on the casing and holds it in its proper protecting position. It is unnecessary to weld the spring to the shock absorber with this construction.

It will be understood that the invention is not to be limited to the exact construction shown and described, but that various changes and modifications may be made without departing from the spirit and scope of the invention, as defined in the appended claim.

What is claimed is:

In a road vehicle having front and rear road wheels, a frame, and a rear axle for said rear road wheels connected to said frame by spring means, a hydraulic shock absorber having a pair of telescoping elements arranged generally vertically between said frame and said rear axle in an exposed position in the path of road material thrown rearwardly by said front road wheels, one of said telescoping elements comprising a relatively thin-walled tubular steel cylinder forming a fluid chamber, a cap closing the lower end of said cylinder and welded thereto, said cap having an integral annular shoulder formed thereon and projecting outwardly beyond the outer surface of said cylinder, means connecting said cap to said rear axle, the other of said telescoping elements being connected to said frame and including a second tubular steel cylinder of larger diameter than said first cylinder and telescopically enclosing the upper portion of said first cylinder, a coiled wire spring having a free diameter smaller than the outside diameter of said first cylinder and encircling said first cylinder in direct contact therewith, said wire spring being of relatively small gauge with its convolutions being so spaced from each other that the spaces are no wider than the diameter of the wire to protect said first-mentioned thin-walled cylinder against damage from impact by foreign material thrown thereagainst from said front road wheels, the lower end of said coiled wire spring being seated upon the shoulder of said cap to hold said spring in place upon said first cylinder, said wire spring extending throughout the vertical extent of the exposed portion of said first cylinder and terminating between said first cylinder and said larger second cylinder.

CLARK A. TEA.

REFERENCES CITED

The following references are of record in the file of this patent:

UNITED STATES PATENTS

| Number | Name | Date |
|---|---|---|
| 1,249,038 | Dabney | Dec. 4, 1917 |
| 2,260,634 | Mullner | Oct. 28, 1941 |
| 2,530,034 | Sjolander | Nov. 14, 1950 |
| 2,549,942 | Smith | Apr. 24, 1951 |